United States Patent [19]

Berly

[11] 4,409,869
[45] Oct. 18, 1983

[54] HORIZONTAL-SPINDLE LATHE

[75] Inventor: Marcel Berly, Verriere le Buisson, France

[73] Assignee: H. Ernault-Somua, Velizyvillacoublay, France

[21] Appl. No.: 253,387

[22] Filed: Apr. 13, 1981

[51] Int. Cl.³ .............................. B23B 3/06; B23B 3/16
[52] U.S. Cl. ......................................... 82/2 R; 29/36;
82/36 A
[58] Field of Search ................ 82/2 R, 36 A, 2 D, 25;
29/36

[56] References Cited

U.S. PATENT DOCUMENTS 3,107,561 10/1963 Haller et al. ........................ 82/2 R
3,423,812 1/1969 Spur ........................................ 29/36

FOREIGN PATENT DOCUMENTS 32642 7/1981 European Pat. Off. .............. 82/2 R
447695 8/1927 Fed. Rep. of Germany .......... 82/25
2658146 7/1978 United Kingdom ................. 82/2 R
56-45302 4/1981 Japan .................................... 82/2 R Primary Examiner—James M. Meister
Assistant Examiner—Jerry Kearns
Attorney, Agent, or Firm—Holman & Stern

[57] ABSTRACT

The horizontal-spindle lathe comprises a bed located within the dihedral angle formed by the two geometrical half-planes which extend from the geometrical axis of the spindle respectively above and behind said axis. Two pairs of slideways on which are mounted respectively two longitudinal-traverse carriages are located respectively on a front longitudinal face and on a bottom longitudinal face of the lathe bed.

6 Claims, 2 Drawing Figures

HORIZONTAL-SPINDLE LATHE

BACKGROUND OF THE INVENTION

1. Field of the Invention

This invention relates to horizontal-spindle lathes and more particularly to the frame structures of machines of this type.

2. Description of the Prior Art

Modern horizontal-spindle lathes have two sets of horizontal slides on which two tool-carriages are capable of sliding respectively and independently of each other. The tools can be mounted either directly on the carriages or else on turrets pivotally mounted on said carriages.

Two types of frames are already known, namely those in which a single bed supports the two sets of slides and those in which the two sets of slides are supported respectively by two beds which are rigidly assembled together or which may also form part of a one-piece frame. These known types of frames all have their disadvantages.

In fact, when a single bed carries both sets of slides, all the slides are usually located in the same plane which is inclined to the horizontal at a sharp angle of slope. In consequence, interferences arise in some instances between the paths of the two carriages and simultaneous operation of both carriages is possible only in a certain number of very special cases. It is therefore impossible to determine a program for machining a workpiece without having recourse to layout drawings in order to ensure that the cycle of machining operations as contemplated is really practicable in the case of the machine under consideration.

Lathe frames of the two-bed type are subject to disadvantages which are inherent in their general design principle and also in each particular form of construction. Broadly speaking, the two-bed design is not wholly suitable for the removal of swarf and problems also arise in regard to the protection of some of the slides as well as control and measurement devices.

In a first known two-bed frame arrangement, the two beds are superposed behind the geometrical axis of the lathe spindle, with the result that, in addition to the general drawbacks mentioned in the foregoing, this solution is relatively costly since it entails the need to ensure strictly parallel alignment of the two sets of slides at the time of assembly of these latter on the two beds, that is to say on two separate units. This drawback is removed if the two beds form part of a single-unit frame but the manufacture of a frame of this type is not unattended by practical difficulties.

In a second known arrangement of two-bed frames, the two beds are placed one behind the other on each side of the vertical geometrical plane which passes through the axis of the spindle below the level of said axis. In consequence, the lathe spindle is located between the two carriages and this gives rise to difficulties in loading and unloading of workpieces. Moreover, the tools carried by the rear carriage are not readily accessible and the two carriages have flat horizontal portions which have the undesirable effect of retaining swarf particles.

In a third known arrangement of two-bed frames, one bed is located substantially below the axis of the spindle whilst the other bed is located substantially at the same level as said axis but behind this latter. In other words, the two-bed assembly has a geometrical surface in the form of an inclined plane which slopes downwards in the forward direction. In this solution, the construction of the lower carriage makes it necessary to place the axis of the spindle in a relatively high position, with the result that the spindle is not readily accessible since it is located between the paths of the two carriages. Finally, it is not easy to reach the tools which are mounted on the upper carriage.

BRIEF SUMMARY OF THE INVENTION

The object of the invention is to provide a horizontal-spindle lathe frame which does not have the disadvantages of the known forms of construction pointed out above.

To this end, the horizontal-spindle lathe according to the invention is of the type comprising a plurality of tool carriages slidably mounted on two pairs of slideways carried by a single bed rigidly fixed on the lathe frame and parallel to the geometrical axis of the rotary workpiece spindle. The lathe is essentially distinguished by the fact that the lathe bed is located within the dihedral angle formed by the two geometrical half-planes which extend from the geometrical axis of the workpiece spindle respectively above and behind said axis. A further distinctive feature of the invention lies in the fact that the two aforementioned pairs of slideways are located respectively on a front longitudinal face and on a bottom longitudinal face of said bed.

By virtue of this particular structure, the lathe under consideration does not have any of the above-mentioned disadvantages of lathes having the known structures discussed above. In the first place, this lathe is clearly not subject to the various disadvantages of two-bed lathes since the lathe under consideration has only one bed. Furthermore, in comparison with the known lathe of the single-bed type recalled above, it is found that the lathe according to the invention does not suffer from the disadvantage of possible interference between the paths of the two carriages since the two faces of the bed on which these two carriages are slidably mounted are located in different planes instead of only one plane, with the result that both carriages can be made to work simultaneously in all types of machining operations. In consequence, the determination of machining programs is not restricted by any potential hazard of interference of the two carriages.

Moreover, the particular structure of the lathe according to the invention has all the advantages which can be attached to the different types of lathe in current use, viz: the rotary workpiece spindle can be located at a standardized height and positioned at a favorable distance for manual loading of workpieces without entailing the need to exert any special effort; the tools carried by the carriages are readily accessible and supervision of the tools is facilitated by the proximity of the operator; removal of swarf is highly efficient since the carriages are both located above the workpiece during the machining operation and the lathe frame need not have any horizontal surface below the workpiece; the devices for control and measurement of the carriage displacements can readily be placed in locations in which they are wholly protected against projections of fluid which is employed in order to facilitate the cutting operation and to cool the cutting edges of the tools.

BRIEF DESCRIPTION OF THE DRAWINGS

These and other features of the invention will be more apparent upon consideration of the following description and accompanying drawings in which one embodiment of the invention is shown by way of example, and in which.

DETAILED DESCRIPTION

Figure 1:
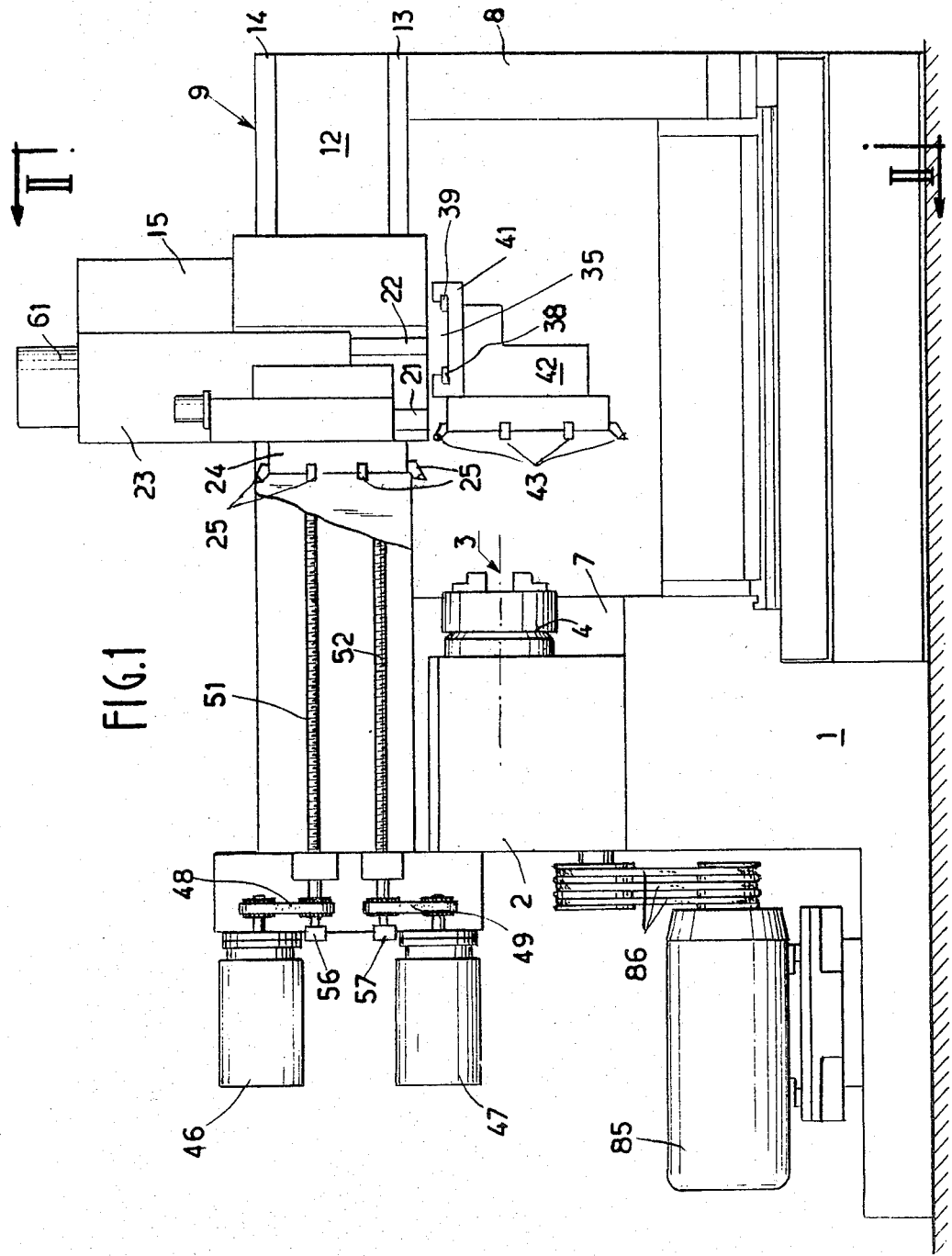
FIG. 1 is a front elevational view with portions broken away and showing a horizontal-spindle lathe according to the invention in which the front protective casing has been omitted.
Figure 2:
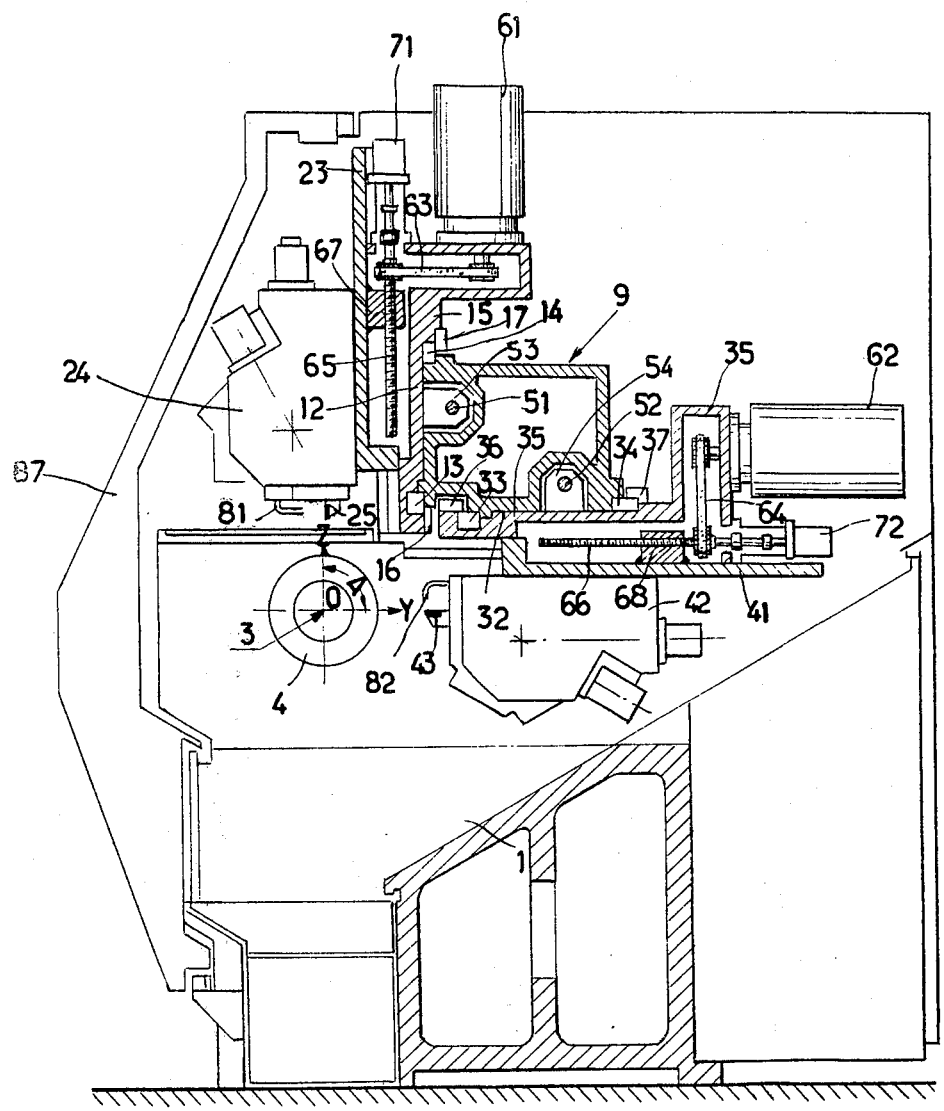
FIG. 2 is a vertical sectional view in side elevation with portions broken away, taken along line II—II of FIG. 1.

The horizontal-spindle lathe shown in FIGS. 1 and 2 comprises a frame 1 for supporting a fixed headstock 2, a horizontal workpiece spindle represented only by its geometrical axis 3 being rotatably mounted in said headstock. In the example shown, the spindle 3 is fitted with a chuck 4 for clamping workpieces to be machined. By means of two columns 7, 8, the frame 1 also supports a bed 9 which is parallel to the spindle 3 and located within the dihedral angle "A" formed by the two geometrical half-planes OZ, OY which extend from the geometrical axis of the workpiece spindle 3 respectively above and behind said axis.

The bed 9 has a longitudinal front face 12 which is vertical in the example illustrated and provided with a lower guiding slideway 13 and an upper retaining slideway 14 on which is slidably mounted an upper horizontal longitudinal-traverse carriage 15. Said carriage is maintained on said slideways respectively by means of two flanges 16, 17 and is in turn provided with two vertical guides 21, 22. A vertical cross-slide 23 is slidably mounted on said guides and adapted to carry a turret 24 for carrying a number of cutting tools 25.

The lathe bed 9 is also provided with a bottom longitudinal face 32 which is horizontal in the example shown and provided with a front guiding slideway 33 and a rear retaining slideway 34 on which is slidably mounted a lower horizontal longitudinal-traverse carriage 35. Said carriage is maintained on said slideways respectively by means of two flanges 36, 37 and is in turn provided with two transverse guides 38, 39. A cross-slide 41 is slidably mounted on said guides and adapted to carry a turret 42 which carries a number of cutting tools 43.

The displacements of the different carriages on their slideways are carried out by any suitable means of conventional type. By way of example, the displacements of the two longitudinal-traverse carriages 15 and 35 are thus carried out respectively by means of two motors 46, 47 via slotted drive-belts 48, 49 and two lead-screws 51, 52 engaged with two nuts 53, 54 respectively which are rigidly fixed to said two carriages. Measuring instruments associated with the two lead-screws and designated by the references 56 and 57 are intended to be employed especially when the machine is of the digital control type. Similarly, the two cross-slides 23 and 41 are actuated respectively from two motors 61, 62 via slotted drive-belts 63, 64 and two lead-screws 65, 66 engaged with two nuts 67, 68 respectively which are rigidly fixed to said two carriages. Measuring instruments 71, 72 are associated with the two lead-screws. There are also shown in FIG. 2 pipes 81, 82 for supplying coolant fluid.

The spindle 3 of the lathe is driven in rotation by any suitable means of conventional type comprising, for example, a motor 85 (as shown in FIG. 1) and a drive system comprising V-belts 86. There is shown in FIG. 2 the transparent front protector 87 which is assumed in FIG. 1 to have been removed.

It will be noted that, by virtue of its particular structure, a lathe of this type offers practically all the advantages of known lathes without having any of their disadvantages. In fact:

the workpiece spindle 3 can be located at a standardized height and positioned at a distance from the front face of the machine such that manual loading and unloading of workpieces can be performed without effort and without danger, especially by virtue of the fact that the operator does not need to climb onto the lathe or onto a stool in order to perform these operations;

the tools 25, 43 are readily accessible and are easier to supervise by reasons of the fact that they are located near the operator;

the carriages do not receive any swarf particles such as chips or shavings, with the result that these latter are not received by the devices for controlling and measuring the displacements of said carriages;

the removal of swarf can take place under the best possible conditions by virtue of the absence of horizontal portions below the work zone of the tools;

no interference takes place between the paths of the two longitudinal-traverse carriages 15, 35, with the result that said carriages can be operated simultaneously and that preparation of the machining program of a workpiece no longer entails any need to determine whether the program is applicable in practice by making use of layout diagrams;

the slideways 13 and 33 for guiding the two longitudinal-traverse carriages 15 and 35 are located as close as possible to the axis of the workpiece spindle, which is a very favorable condition for ensuring high machining accuracy;

finally, since all the carriage slideways are carried by a single bed, the manufacturer encounters less difficulty in obtaining strictly accurate parallel alignment of said slideways than in the case of lathes of the two-bed type.

As will readily be apparent, the invention is not limited to the embodiment which has been described with reference to the accompanying drawings and which has been given solely by way of example. Depending on the applications which are contemplated, many modifications may be made without thereby departing either from the scope or the spirit of the invention.

Thus it follows for example that, in the form of construction described in the foregoing, the front longitudinal face of the bed is located in a vertical plane but it could also be inclined. Similarly, the bottom longitudinal face of the bed need not be horizontal but could be inclined, especially upwards and towards the rear.

What is claimed is:

1. A horizontal spindle lathe comprising,
   a frame,
   a workpiece spindle headstock rigidly secured to said frame,
   a workpiece spindle rotatably mounted in said headstock and having a horizontal axis,
   a single elongated bed rigidly supported by said frame and extending in parallel relation with said workpiece spindle axis, said bed being located within the dihedral angle formed by two geometrical half planes extending horizontally to the rear of and vertically upwardly from said axis of said workpiece spindle and having a front longitudinal face and a bottom longitudinal face, a pair of front slideways extending longitudinally on said front face and a pair of bottom slideways extending longitudinally on said bottom face of said bed, and a front and bottom cutting tool-carrying carriage mounted for sliding movement on each of said front and bottom slideways.

2. A horizontal spindle lathe according to claim 1 and further comprising a cross-slide mounted on each of said carriages, cutting tools operatively mounted on each cross-slide, a control device mounted at the upper portion of the cross-slide on the carriage mounted on said front slideways and operatively engaged therewith for controlling movement thereof, and a control device mounted at the rear portion of the cross-slide mounted on said bottom slideways and operatively engaged therewith to control the movement thereof.

3. A horizontal spindle lathe according to claim 1, wherein said workpiece spindle headstock has a top face located at a level not higher than the path of travel of the carriage mounted on said front slideways.

4. A lathe according to claim 1, wherein said front and bottom faces extend in planes which intersect to form a common line, each pair of slideways comprises a guiding slideway and a retaining slideway and the two guiding slideways are located in the immediate vicinity of said common line of intersection of the planes of the front longitudinal face and the bottom longitudinal face of the lathe bed.

5. A lathe according to claim 1, wherein the front longitudinal face of the lathe bed is vertical.

6. A lathe according to claim 1, wherein the bottom longitudinal face of the lathe bed is horizontal.

* * * * *